United States Patent [19]

Gardner et al.

[11] Patent Number: 4,634,741

[45] Date of Patent: Jan. 6, 1987

[54] PROCESS FOR PREPARING IMPROVED HALOGENATED BUTYL RUBBERS

[75] Inventors: Irwin J. Gardner, Scotch Plains; James V. Fusco, Red Bank, both of N.J.; Francis P. Baldwin, Coupeville, Wash.

[73] Assignee: Exxon Research & Engineering Co., Florham Park, N.J.

[21] Appl. No.: 806,552

[22] Filed: Dec. 9, 1985

Related U.S. Application Data

[62] Division of Ser. No. 597,188, Apr. 5, 1984.

[51] Int. Cl.$^4$ .............................................. C08F 8/20
[52] U.S. Cl. ................................ 525/355; 525/332.8; 525/333.1
[58] Field of Search .................................. 525/355, 356

[56] References Cited

U.S. PATENT DOCUMENTS

| | | | |
|---|---|---|---|
| 2,809,372 | 10/1957 | Frederick et al. | 525/355 |
| 3,042,662 | 7/1962 | Cottle et al. | 525/355 |
| 3,515,687 | 6/1970 | Listner | 525/355 |
| 4,486,575 | 12/1984 | Newman et al. | 525/356 |
| 4,563,506 | 1/1986 | Kowalski et al. | 525/356 |

*Primary Examiner*—Joseph L. Schofer
*Assistant Examiner*—Bernard Lipman

[57] ABSTRACT

Improved halogenated butyl rubbers are prepared by isomerizing the polymers so that a significant mole fraction of the halogen is in the primary allylic position. The isomerization is carried out utilizing as a catalyst either a Friedel Crafts catalyst or HBr.

8 Claims, No Drawings

PROCESS FOR PREPARING IMPROVED HALOGENATED BUTYL RUBBERS

This is a division of application Ser. No. 597,188, filed 4/5/84.

BACKGROUND OF THE INVENTION

One of the first olefinically unsaturated synthetic elastomers to be commercially produced was butyl rubber. The expression "butyl rubber" is used in the rubber industry to describe copolymers made from a polymerization reaction mixture having therein from 70 to 99.5% by weight of an isoolefin which has about 4 to 7 carbon atoms, e.g. isobutylene, and about 30 to 0.5% by weight of a conjugated multiolefin having from 4 to 14 carbon atoms, e.g. isoprene. The resulting copolyers contain 85 to 99.5% by weight combined isoolefin and about 0.5 to about 15% combined multiolefin.

The preparation of butyl rubber is described in U.S. Pat. No. 2,356,128, which is incorporated herein by reference. Butyl rubber generally has a number average molecular weight of about 5,000 to about 500,000, preferably 80,000 to 250,000 and a Wijs Iodine No. of about 0.5 to 50 preferably 1 to 15. Low molecular weight butyl rubber is generally defined as having a $M_v$ of 5,000 to 30,000 and 2–10 mole % unsaturation. The viscosity average molecular weight ($M_v$) of commercial butyl rubber is about 100,000 to about 500,000, preferably about 250,000 to 500,000.

The polymer backbone of commercial butyl rubber is made up primarily of isobutylene units, with just a few percent isoprene units. The isoprene units contribute the small amount of unsaturation present in butyl rubber. The basic preparative equations are represented by:

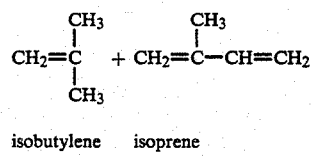

isobutylene  isoprene which combine to form its main structure:

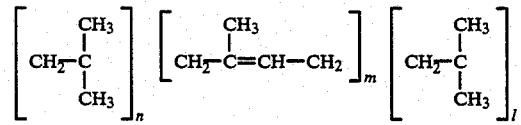

wherein n+1 represents the number of isoolefin units incorporated in the butyl rubber, while m represents the number of diolefin units present, substantially as isolated units. The conjugated diolefin loses its diene unsaturation upon its incorporation into the polymer backbone.

Thus butyl rubber, as presently produced, contains only a small percentage of unsaturation, in the form of the monoolefin structure associated with the isoprene residue which is incorporated more or less randomly throughout the polymer chain.

The reactivity of the butyl rubbers and consequently their cure rate is substantially less than the high unsaturation natural and synthetic rubbers. In an effort to improve cure characteristics of the butyl rubbers, these synthetic polymers have been halogenated. Halogenated butyl rubber has contributed significantly to the elastomer industry. A method of preparing halogenated butyl rubber is described in U.S. Pat. No. 3,099,644 which is incorporated herein by reference. Both chlorinated and brominated butyl rubbers are known in the art. The structural formula for halogenated butyl rubber is typically represented as being:

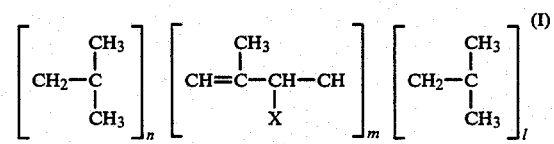

where X represents the halogen and n, l and m have the same values as described above for butyl rubber. This structure, however, is one of several which can be formed, depending on the conditions of halogenation, the halogenating agent, used etc. Other structural configurations which may occur in halogenated butyl rubbers are

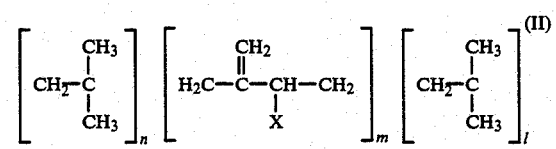

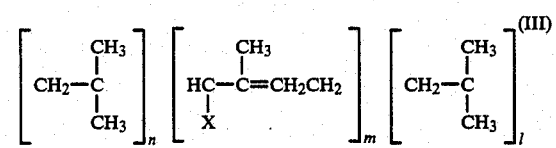

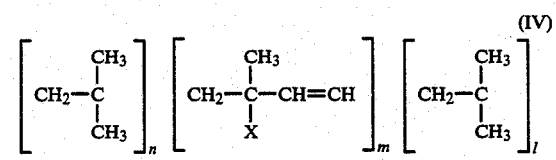

It will be noted that in each case the halogen is present as a secondary or tertiary allylic halogen.

More recently, U.S. Pat. No. 4,288,575 to Irwin Gardner (which has an effective filing date of Mar. 7, 1977) discloses a new structural configuration for the halogenated rubber where the rubber contains conjugated diene which is represented as

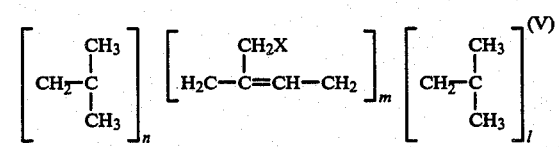

In this structure the halogen, X, is in a primary allylic position. The method disclosed in U.S. Pat. No. 4,288,575 for preparing these rubbers involves the user of a copper oxide catalyst for dehydrohalogenation of butyl rubber to form a conjugated diene rubber.

As shown in Example 6 of the Gardner U.S. Pat. No. 4,288,575 this primary halogen is in a more stable configuration than the secondary halogens of the prior art and is not readily removed. The copper oxide catalyst was taught in Gardner's earlier U.S. Pat. No. 4,145,492 to be a dehydrohalogenation catalyst suitable for the preparation of conjugated diene rubber. Where Gardner produces polymers containing the structure of Formula V that structure is invariably associated with conjugated diene.

Table I of U.S. Pat. No. 4,288,575 shows various halogenated conjugated diene-containing polymers which are shown to have the halogen in the primary position. Not surprisingly, the residual halogen is always associated with substantial amounts of conjugated diene. Since the catalyst is a dehydrohalogenation catalyst, dehydrohalogenation is proportional to the degree of contact of polymer with the catalyst, and similarly, the degree of rearrangement of halogen from the secondary to the primary position is related to the degree of dehydrohalogenation.

Where high amounts of residual halogen are present in the polymer, as in Run A of Table I of U.S. Pat. No. 4,288,575, it is the result of an initiallly high level of halogenation; here 1.95 wt. % bromine. Since the degree of rearrangement is proportional to the degree of dehydrohalogenation Gardner's polymers cannot be low in conjugated diene and at the same time have appreciable amounts of halogen present in the primary allylic position.

In 1979 Van Tongerloo et. al. disclosed a brominated butyl rubber which was low in conjugated diene content (if any) and had the primary halogen configuration. The polymer is represented as having the structure

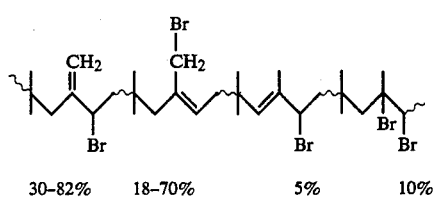

The reference states that the polymer was produced by a proprietary method and Van Tongerloo et. al. disclose only that rearrangement to the more stable primary configuration can be accomplished in brominated butyl rubber "under a variety of conditions-for example, in the presence of acid, free radicals, bases or heat." See Van Tongerloo, A. and Vukov, R., *Proceedings, International Rubber Conference*, Milan, Italy, 1979, p.70ff. The skilled chemist will recognize that this gratuitous disclosure represents the techniques which can be enumerated to accomplish an infinite number of reactions. The disclosure in no way teaches any method to prepare the polymer disclosed.

Van Tongerloo et. al. designate the methylene configuration of Formula VI above as "EXO" and the primary bromo configuration of Formula V as "ENDO". It is alleged that even at ratios of ENDO:EXO of 71:16 there is no clear indication of a correlation between vulcanizate properties and polymer microstructure. Hence, Van Tongerloo et. al. have not appreciated that the polymer which they purportedly made by an undisclosed proprietary process has any properties which are different than those of conventional halogenated butyl rubber.

Subsequent to the making of the instant invention, Vukov disclosed that certain model compounds can be heated to 150° C. for 30 minutes to accomplish a molecular rearrangement as follows:

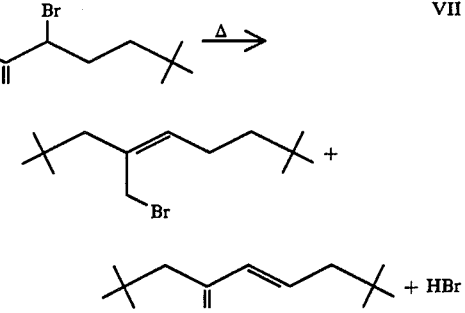

No substantial rearrangement of the chlorinated model was observed. See Vukov, R., "Halogenation of Butyl Rubber and The Zinc Oxide Cross-Linking Chemistry of Halogenated Derivatives" which was presented to the ACS Rubber Division on Oct. 25, 1983. Those skilled in the art will recognize that what is true about simple molecules (model compounds) may not necessarily be true about complex polymer molecules.

SUMMARY OF THE INVENTION

It has surprisingly been found that conventional butyl rubbers can be caused to undergo an isomerization wherein a substantial fraction of the halogen is isomerized from its usual secondary allylic configuration to a primary allylic configuration.

The isomerization of butyl rubber is accomplished using a Friedel-Crafts catalyst or HBr as the catalyst.

DETAILED DESCRIPTION

This invention relates to halogenated butyl rubber having improved cure and adhesion properties. More particularly, it relates to halogenated butyl rubber wherever a significant fraction of the available halogen is present as a primary allylic halogen.

In the practice of this invention a conventional halogenated butyl rubber, prepared using commercially known techniques is treated to cause an isomeric rearrangement of the halogen from the secondary allylic configuration to a primary allylic configuration. The isoprene utilized in the manufacture of butyl rubber is generally incorporated into the rubber in the following configuration:

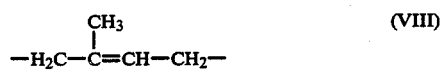

the halogen is generally incorporated in a configuration depicted as

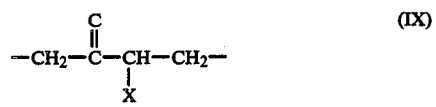

wherein X is halogen. The site of unsaturation is external to the backbone of the polymer. In the butyl rubber polymers of this invention the halogen is incorporated in a structure having the configuration

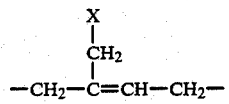
(X)

Other halogen configurations include

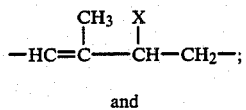
(XI)

and

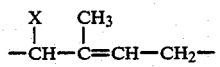
(XII)

Throughout the specification and claims the configurations of formulas VIII, IX and X will be referred to as Type I, II and III configuration respectively.

The polymers of this invention are distinguished from the polymers of U.S. Pat. No. 4,288,575 in that they contain less than 0.25 mole % conjugated diene and at least 0.6 wt. % halogen, wherein at least 20 mole % to 100 mole % of the halogen is in the Type III configuration. Generally, about 25 mole % to about 90 mole percent of the halogen will be present in the Type III configuration. Preferably, at least 30 mole % to about 85 mole %, more preferably at least 40 mole % of the halogen is present as the Type III configuration. The halogenated butyl rubber may be either chlorinated or brominated. The halogen content is preferably at least 0.8 wt. % to about 2.4 wt. %, more preferably the halogenated butyl rubber contains at least 0.9 wt. % halogen to about 1.8 wt. %, e.g. about 1.4 wt. %.

In the process of preparing the halogenated butyl rubber of this invention some halogen may be lost as a result of some degree of dehydrohalogenation which may result in the formation of a conjugated diene structure. The conjugated diene (CD) content of the polymer, however, will be less than 0.25 mole %. Generally, the CD content will be less than 0.20 mole % preferably less than 0.15 mole %.

In the preparation of the halogenated butyl rubber of this invention the halogenated rubber is prepared by treating conventional halogenated butyl rubber with a Friedel-Crafts catalyst, e.g. ZnCl$_2$. The brominated form is prepared by treating conventional brominated butyl rubber with HBr.

In the Friedel-Crafts catalytic isomerization of halogenated butyl rubber the halogenated butyl rubber is dissolved in a nonpolar solvent and contacted with a Friedel-Crafts catalyst. Preferably, the reaction can be carried out in the presence of anhydrous HCl or anhydrous HBr, preferably selecting the same halogen for the acid as is present in the catalyst.

Any hydrocarbon which is a solvent of butyl rubber can be used as the nonpolar solvent. Illustrative non-limiting examples of such solvents are hexane, heptane, octane, toluene, xylene etc. Since butyl rubber is generally halogenated in a solution of hexane, hexane is the preferred solvent. The concentration of halogenated butyl rubber in solvent is not critical. However, the concentration must not be so small as to make the process uneconomical or so large that the polymer cement is too viscous to handle. Generally, the polymer concentration in the solvent is about 5 wt. % to about 25 wt. %, preferably about 10 wt. % to about 15 wt. %.

The Friedel-Crafts catalyst can be added directly to the polymer solution or it can first be dissolved in diethyl ether. Dissolving the catalyst in ether results in a fine dispersion of catalyst upon addition to the hexane cement. Preferably, in selecting a halogenated catalyst the halogen of the catalyst corresponds to the halogen of the polymer.

Suitable Friedel-Crafts catalysts include ZnCl$_2$, FeCl$_3$, BF$_3$, BCl$_3$, aluminum alkyl halides and trialkyl aluminum of the formulas R$_3$Al, R$_2$AlX and RAlX$_2$ wherein R is an alkyl group of 1 to 8 carbon atoms, preferably C$_1$-C$_2$ alkyl, and X is halogen preferably chlorine or bromine; gallium chloride, zinc bromide, aluminum chloride, aluminum bromide, and antimony halides. The ratio of catalyst to rubber on a weight basis can be about 1:100 to about 1:1000, preferably about 1:200 to about 1:300.

The reaction temperature can vary from about 20° C. to 150° C., preferably about 40° C. to about 130° C., more preferably about 60° C. to about 110° C., e.g. 90° C. The reaction time can be about 2 minutes to about 3 hrs. Longer reaction times may be used since the rearrangement results in stable polymer. Preferably, the reaction time is about 5 minutes to about 60 minutes.

The quantity of anhydrous HCl or HBr, when used, is not critical. However, it is preferably present in excess with respect to the Friedel-Crafts catalyst. The ratio of HCl or HBr to catalyst can be about 0.5/1 to 100/1, preferably about 5/1 to 20/1, most preferably about 10/1. In a preferred method the HCl or HBr is added by purging the reaction mixture with a stream of anhydrous HCl or HBr continuously throughout the reaction.

The method of this invention for the isomerization of conventional chlorinated butyl rubber to the primary allylic chlorine containing polymer of this invention is illustrated by the following examples:

EXAMPLE I

A commercial chlorinated butyl rubber was dissolved in heptane so that a 15% by weight solution of rubber (928 grams) was prepared. ZnCl$_2$ was dissolved in ether (3.1 grams in 25 ml) and added with constant stirring to the chlorinated butyl rubber cement which had been heated to 84° C. The mixture was purged with a continuous gas stream of anhydrous HCl at a rate of about 11.5 cc/min. The weight ratio of HCl to ZnCl$_2$ was about 10/1. The results are tabulated in Table I.

TABLE I

| Time (min) | Chlorine content (wt %) | Mooney ML (1 + 8) 125° C. | Mv | Isomer Type[1] I | II | III | IV[3] | CD[2] content |
|---|---|---|---|---|---|---|---|---|
| 0 | 1.35 | 40 | 433K | 0.19 | 0.71 | 0 | .10 | 0.03 |
| 105 | 1.07 | 16 | 300K | 0.07 | 0.38 | 0.48 | .07 | 0.13 |

[1] mole fraction
[2] mole percent
[3] Type IV is

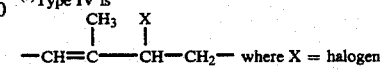
where X = halogen

It is evident that the process of this invention produces a chlorinated butyl rubber isomer having a significant fraction of the chlorine present in the type III configuration and with substantially no conjugated diene.

EXAMPLE II

The method of Example I was repeated with minor modifications. The $ZnCl_2$ was added directly to the polymer cement without first dissolving it in ether. The reaction time was 135 minutes. It was found that the $ZnCl_2$ was wet; therefore 4 grams of $FeCl_3$ was added and reacted for an additional 35 minutes. The product had a chlorine content of 1.09 wt% (as determined by X-ray analysis), a Mooney viscosity of 21.2 [ML(1+8)125° C.], a CD content of 0.05 mole % and a Mv of 415,000. The ratio of Type I, II, III and IV configuration as found by 400 MHz NMR was 0.12:0.55:0.22:0.11.

EXAMPLE III

Example I was repeated using 528 grams of chlorinated butyl rubber in heptane (15 % solution). Four grams of fresh $ZnCl_2$ was added and the isomerization was carried out for about 66 minutes at 90° C. The anhydrous HCl flow rate was about 15 cc/min. The system was then cooled to 0° C. and 8 g $Cl_2$ was added through a glass frit in order to further halogenate the polymer. The final prooduct had a chlorine content of 1.42 wt%, a Mooney of 16.5, an Mv of 290,000 and a residual zinc content of 60 ppm. The number average molecular weight was 114,000. Based on 400 MHz NMR the ratio of types I, II, III and IV configuration was 0.0:0.66:0.26:0.08.

EXAMPLE IV

The polymers of Examples I, II and III were tested in zinc oxide cures against commercial chlorinated and brominated butyl rubber. The results are shown in Tables II and III.

TABLE II

| Component[a] | A | B | C | D |
|---|---|---|---|---|
| E-I[1] | 100 | — | — | — |
| E-2[2] | — | 100 | — | — |
| E-3[3] | — | — | 100 | — |
| R-I[4] | — | — | — | 100 |
| Stearic Acid | 1.0 | 1.0 | 1.0 | 1.0 |
| IRB #5[5] | 40 | 40 | 40 | 40 |
| ZnO(NBS) | 5 | 5 | 5 | 5 |
| Monsanto Rheometer Results (ASTM 2084) | | | | |
| $M_H$, in-lbs | 42.2 | 40.3 | 50 | 39 |
| $M_H-M_L$, in-lbs | 25.6 | 26.3 | 35 | 24.2 |
| t 50, min | 8.2 | 7.0 | 6.1 | 7.5 |
| t 90, min | 23.0 | 20 | 20 | 15 |
| t s2, min | 1.7 | 1.5 | 1.2 | 2.95 |
| Slope, in-lb/min. | 2.36 | 2.53 | 3.53 | 2.37 |
| Mooney Scorch 5 pts @ 125° C. (min) | 7.2 | 6.8 | 5.6 | 21. |

[a]Amounts shown are parts by weight
[1]Chlorinated butyl rubber of Example I
[2]Chlorinated butyl rubber of Example II
[3]Chlorinated butyl rubber of Example III
[4]Chlorinated butyl rubber used in Example I-III to make polymer of this invention with a chlorine content of 1.35
[5]HAF black - oven dried A comparison of the cure response shows that, notwithstanding the fact that polymer of Examples I and II had a chlorine content 20% lower than the control (Run D), the state of cure ($M_H-M_L$) was at least as high and the rate of cure (slope) was at least as fast. Additionally, the shorter scorch times also indicate a faster onset of cure. Where the polymer of this invention (Run C) had a chlorine content equivalent to the control (Run D), the state of cure was even greater notwithstanding the fact that the type III content of the polymer was about 26%.

TABLE III

| Component | E | F | G | H |
|---|---|---|---|---|
| E-III | 100 | — | 100 | — |
| R-II[1] | — | 100 | — | — |
| Commercial Chlorinated Butyl | — | — | — | 100 |
| Stearic Acid | 1.0 | 1.0 | 1.0 | 1.0 |
| IRB #4[2] | 50 | 50 | 50 | 50 |
| ZnO (NBS) | 5 | 5 | — | — |
| Calcium Stearate | — | — | 1.5 | 1.5[3] |
| Monsanto Rheometer Results | | | | |
| $M_H$ | 81 | 64 | 73.5 | 59.5 |
| $M_H-M_L$ | 61 | 39.1 | 56.8 | 41.3 |
| $t_{50}$ | 14.2 | 12.4 | 13.1 | 15.8 |
| $t_{90}$ | 37.5 | 17.2 | 30 | 25.5 |
| $t_{s2}$ | 0.75 | 4.5 | 3.5 | 3.8 |
| Slope | 2.95 | 4.37 | 4.47 | 1.86 |
| Mooney Scorch | | | | |
| 3 pts @ 135° C., (min.) | 3.4 | 11.6 | 6.4 | — |
| 5 pts @ 125° C., (min.) | — | — | — | 21 |

[1]Brominated polymer 1.85 wt % bromine, $M_v = 490,000$
[2]SRF furnace black
[3]Present in polymer following commercial production.

The surprising finding here is that the chlorinated polymer (26% type III) of this invention has a faster cure than a brominated polymer having a bromine content of 1.85 wt%. (Compare E and F).

Cure response of the isomerized halobutyl rubber, E-III, was further modified by addition of 1.5 parts of calcium stearate (Composition G) to delay cure initiation (scorch time, $t_{s2}$). In comparison to the reference polymer (R-II) it still shows a significantly higher state of cure, faster initial cure rate (slope) and shorter cure initiation time. Compared to a commercially produced chlorinated butyl rubber sample containing 1.35 wt. % chlorine and calcium stearate, the isomerized halobutyl had a higher state of cure and significantly faster initial cure rate (slope).

EXAMPLE V

Example I was repeated using 200 grams of a 25% solution of chlorinated butyl rubber. Instead of $ZnCl_2$, the catalyst used was 0.327 g of $FeCl_3$ in 66 g of $CHCl_3$. The reaction was carried out at 50° C. and the results are shown in Table IV.

TABLE IV

| Run Time | Cl wt % | Configuration Type | | | Mv × $10^{-3}$ | gel |
|---|---|---|---|---|---|---|
| | | I | II | III | | |
| 20 | 1.06 | 0 | .29 | .71 | 359 | 12.4 |
| 60 | 1.05 | | | | 708 | |
| 105 | — | | | | gel | |

It is apparent that ferric chloride is a more active catalyst and shorter reaction times can be used to achieve a high degree of isomerization.

EXAMPLE VI $H_2SO_4$ was used in an attempt to isomerize brominated butyl rubber. Concentrated $H_2SO_4$ (16 g) was added to 300 grams of rubber in 2700 grams of solvent (Isopar G, an isooctane process by-product). The reaction was run at 80° C. The bromine content was reduced from 1.85 wt% to 1.4 wt%. The viscosity average molecular weight of the rubber was reduced to 17,000 from an original value of 492,000. While significant isomerization occurred, the gross degradation of molecular weight resulted in a product which has value only as a low molecular weight brominated butyl rubber. In applications requiring high molecular weight such a material would not be useful.

EXAMPLE VII

Approximated 290 grams of a 20% solution of brominated butyl rubber was heated with HBr at 30° C. About 110 cc/min of HBr was bubbled through the solution and samples removed periodically for analyses. The results are shown in Table V

TABLE V

| Time (Sec) | Br wt % | $\bar{M}v \times 10^{-3}$ | Configuration I: | II: | III |
|---|---|---|---|---|---|
| 0 | 2.06 | 433 | .15 | .81 | .04 |
| 417 | — | 417 | — | — | — |
| 775 | 2.32 | 231 | — | — | — |
| 2430 | 2.58 | 210 | .04 | .325 | .634 |
| 3626 | — | 210 | .048 | .270 | .714 |

While there was substantial rearrangement, there was also severe degradation of the polymer. Attempts to cause rearrangement of chlorinated butyl rubber using HCl were unsuccessful.

EXAMPLE VIII

The experiment of Example VII was repeated over a temperature range of −52° to −42° C. After 397 seconds of treatment with anhydrous HBr the bromine content increased from 1.87% to 2.13 wt% while the Mv which was initially 492,000, dropped to 370,000. The ratio of Type I, II, III and IV configuration was 0.1:0.17:0.56:0.17 as compared to original values of 0.162:0.764:0.074:0. Hence, the low temperature treatment of brominated butyl with HBr results in substantial rearrangement with an acceptable degree of degradation of the polymer.

It is apparent from the forgoing examples that it is insufficient merely to select an acid to accomplish the isomerization of this invention. The appropriate acid must be selected and it must be utilized at the proper temperature. Otherwise, severe degradation of the base polymer i.e. reduction in molecular weight, occurs.

The viscosity average molecular weight of the product of this invention should be at least 100,000, preferably at least 200,000, most preferably at least 250,000; e.g. at least 300,000.

In conducting the isomerization process of this invention to produce a brominated butyl rubber having a significant fraction of the bromine in the primary allylic configuration the reaction temperature should be less than 40° C., preferably less than 30° C., more preferably less than 10° C.; e.g. less than 0° C. In a particularly preferred embodiment sub zero reaction temperatures in the order of −10° C. to about −100° C. may be advantageously used; preferably the sub zero temperatures utilized in carrying out the process of this invention is about −30 to about −75° C. The reaction time may vary from about 2 minutes to about 3 hours, preferably from about 5 minutes to about 60 minutes.

The isomerization of the brominated butyl rubber is carried out in solution using a non-polar hydrocarbon solvent. The solvents suitable for the chlorinated butyl rubber isomerization reaction may be used for brominated butyl rubber also. The concentration of polymer in the solvent is preferably about 5% to about 25% by weight as in the chlorinated polymer, and the preferred polymer concentration is about 10% to 20%.

The HBr is preferably anhydrous, and an excess of acid relative to polymer is required. The mole ratio of acid to brominated polymer should be about 0.5/1 to 50/1, preferably about 6/1 to about 12/1, e.g. about 10/1.

The modified cure response observed with halogenated butyl rubbers having a significant amount of halogen in the primary allylic configuration suggests that they may covulcanize with other rubbers and have improved adhesion. This is demonstrated by the following examples.

EXAMPLE IX

A commercial sample of brominated butyl rubber produced in a solution process (SOL Br-Bu) was compared with an isomerized brominated butyl rubber of this invention in a zinc oxide cure system as described below.

|  | SOL Br—Bu | Isomerized Br—Bu |
|---|---|---|
| Br (wt. %) | 1.8–2.2 | 2.0–2.2 |
| Ca Stearate (wt. %) | 1–2 | 2.5 |
| ESBO[1] (wt. %) | 1–2 | 2 |
| mole % Type III Br | 10 | 65 |
| CD mole % | — | .001 |

[1] epoxidized soybean oil.

The ESBO and calcium stearate act as cure retardants. The rubbers were compounded with 50 parts of SRF black, 5 parts zinc oxide and 1 part of stearic acid to 100 parts by weight of rubber. The compounds were tested on the Monsanto Rheometer at 160° C. for 30 minutes using a 5° arc. The results were as follows:

|  | SOL Br—Bu | Isomerized Br—Bu |
|---|---|---|
| $M_H-M_L$ (in-lb) | 22 | 20–27 |
| $t_{90}$ (minutes) | 11 | 4–5 |

Notwithstanding the fact that the experimental rubber contained higher levels of cure retardant it cured faster than the conventional brominated butyl rubber.

EXAMPLE X

The rubbers of Example IX were compared for adhesion properties by preparing innerliner formulations and curing them to a tire carcass composition using the formulations shown in Table VI, all values being parts by weight:

TABLE VI

| Component | CARCASS | INNERLINER SOL Br—Bu | Isomerized Br—Bu |
|---|---|---|---|
| Natural Rubber | 100 | — | — |
| SOL Rubber | — | 100 | — |
| Isomerized Rubber | — | — | 100 |
| N-660 Black | 50 | 55 | 55 |
| Flexon 641[1] | — | 6 | 6 |
| Sundex 790 DOP | 5 | — | — |
| Escorez 1102[2] | 2 | 6 | 6 |
| Stearic Acid | 2 | 2 | 2 |
| ZnO | 5 | 3 | 3 |
| Sulfur | 2.3 | 0.5 | 0.5 |
| MBTS | — | 1.5 | 1.5 |

TABLE VI-continued

| | INNERLINER | |
|---|---|---|
| Component | CARCASS | SOL Br—Bu | Isomerized Br—Bu |
| Santocure NS[3] | 1 | — | — |
| Maglite K[4] | — | 0.25 | 0.25 |
| Wingstay 100[5] | 2 | — | — |
| Struktol 40 MS[6] | — | 7 | 7 |

[1] Naphthenic rubber process oil - Exxon Chem. Co.
[2] Hydrocarbon tacifier resin - Exxon Chem. Co.
[3] Cure accelerator, N—t-butyl-2-benzothiazole sulfenamide - Monsanto Co.
[4] MgO - Merck Co.
[5] Antioxidant, mixed diaryl-p-phenylene-diamines-Goodyear Chemicals.
[6] Proprietary mixed resin - Struktol Co.

The carcass composition and innerliner compositions were laminated and vulcanized together using 2,000 psi at a temperature of 150° C. for 30 minutes. The results are shown in Table VII.

TABLE VII
COMPARISON OF BROMINATED BUTYL RUBBERS IN INNERLINER TEST

| | SOL Br Bu | Isomerized Br |
|---|---|---|
| Scorch, T3, 135° C.; min. | 25 | 15 |
| Adhesion to NR carcass, lb./in. | | |
| @ 25° C. | 110 | 180 |
| @ 100° C. | 39 | 55 |

The rheometer and stress-strain properties of the halogenated polymers in these compositions were similar. However, it is evident from the above results that the halogenated butyl rubbers of this invention are superior in adhesion to conventional rubbers. Hence, they would find particular utility in applications requiring good adhesion performance, e.g., tubeless tire innerliners.

What is claimed is:

1. A process for treating a brominated butyl rubber to isomerize the rubber thereby shifting a substantial fraction of the bromine from an initial secondary allylic configuration to a primary allylic configuration which comprises contacting a solution of the rubber with HBr at a temperature of less than 40° C. for a time sufficient to effect the isomerization, the molar ratio of HBr to brominated rubber being about 0.5/1 to about 50/1.

2. The process according to claim 1 wherein the ratio of HBr to brominated butyl rubber is about 6/1 to about 12/1.

3. The process according to claim 1 wherein the reaction temperature is less than 30° C.

4. The process according to claim 3 wherein the reaction temperature is less than 10° C.

5. The process according to claim 4 wherein the reaction temperature is about −10° C. to about −100° C.

6. The process according to claim 5 wherein the reaction temperature is about −30° C. to about −75° C.

7. The process according to claim 1 wherein the solution comprises hexane or heptane as a solvent.

8. The process according to claim 1 wherein the solution comprises hexane or heptane as a solvent.

* * * * *